United States Patent [19]

Eriksson

[11] 4,001,925
[45] Jan. 11, 1977

[54] CUTTING TOOL
[75] Inventor: Stig-Lennart Eriksson, Fagersta, Sweden
[73] Assignee: Seco Tools AB, Fagersta, Sweden
[22] Filed: Oct. 7, 1975
[21] Appl. No.: 620,404
[30] Foreign Application Priority Data
Oct. 16, 1974 Sweden .............................. 7413006
[52] U.S. Cl. .................................................. 29/96
[51] Int. Cl.² ......................................... B26D 1/12
[58] Field of Search ........................................ 29/96
[56] References Cited
UNITED STATES PATENTS

| 936,793 | 10/1909 | Middleton | 29/95 R |
|---|---|---|---|
| 1,480,987 | 1/1924 | Britt | 29/96 |
| 1,484,332 | 2/1924 | Jaques, Jr. | 29/96 |
| 2,865,084 | 12/1958 | Wendt et al | 29/96 |
| 3,500,522 | 3/1970 | Stier | 29/96 |
| 3,662,445 | 5/1972 | Whitaker | 29/96 |

FOREIGN PATENTS OR APPLICATIONS

| 964,725 | 7/1964 | United Kingdom | 29/96 |
|---|---|---|---|
| 607,417 | 8/1948 | United Kingdom | 29/96 |

Primary Examiner—Harrison L. Hinson
Attorney, Agent, or Firm—Pierce, Scheffler & Parker

[57] ABSTRACT

The cutting tool of the invention is of the type comprising a tool holder and a cutting insert held in a longitudinal recess in the tool holder by means of a clamp, which clamp is actuated by means of a screw in engagement with the tool holder. According to the present invention, the clamp is supported by the inner wall of the recess, and the screw is actuated from the side of the tool.

7 Claims, 4 Drawing Figures

CUTTING TOOL

The present invention relates to the cutting machine art, and is concerned with a tool for chipforming machining and, in particular, to a parting-off and recessing tool in which a separate cutting insert is clamped in a tool holder by means of a clamping device.

Parting-off tools often work under severe cutting conditions. Because the cutting speed in a parting-off operation decreases towards the center of the workpiece, there is always a risk of edge build-up and of virbrations. The actual cut-off moment is critical for the cutting edge. On one hand, the cutting speed is almost zero and, on the other hand, there is risk of the cutting edge being damaged when the cut-off part falls away.

Another, and frequent, problem in parting operations is a tendency of the tool to move obliquely resulting in a poor or uneven surface being produced. Furthermore, the tool may be required for use in facing operations involving also axial forces in addition to the tangential and radial forces of normal parting operations. This demands a very high degree of rigidity in the tool holder. Grooves, grinding reliefs, etc. are often produced using a recessing tool having an insert with a straight front cutting edge. Furthermore, a high degree of accuracy for both the holder and the cutting insert is necessary to avoid making dimensional compensations when changing the insert.

It previously was known to attach a cutting insert to a tool holder by means of mechanical clamping devices, by brazing or by similar methods. The mechanical clamping devices have usually compresed a clamp arranged as a lever which, in its turn, has been controlled or moved by a screw connected with the tool holder. The screw has normally been operated from the top side or upper face of the tool, and its longitudinal direction has usually been essentially perpendicular to the longitudinal direction of the clamp or the tool holder. By a movement of the screw downwards, the free end of the clamp has consequently forced the cutting insert down against its support in the holder.

It is "old," also, to arrange the clamp so that its downward or "squeezing" movement can be actuated from the side face of the tool holder. In such a known tool, the clamp was arranged as a lever pivotally carried in a recess, one end or a leg of the lever clamping the insert to the support and the other end or leg of the lever being controlled or lifted by a rotatable cam lock.

In recessing or parting-off tools, the mechanical clamping devices heretofore used have, however, suffered from serious drawbacks or limitations. As indicated before, in the cutting operation, there are extreme demands upon the rigidity of the tool holder and insert. At the same time, the possible width of the tool is often limited, and the front end of the clamp must be thinner or smaller than the width of the cutting insert or than the length of the cutting edge. In many cases also a considerable length or radial extension of the clamp is desirable in order to make cutting or parting-off of large work-pieces possible.

It is axiomatic that in parting-off tools provided with a mechanical clamping device controlled by a screw extending in the same direction as the motion of the clamp, the minimum width of the clamp or of the tool is determined by the width of the screw. Since great demands upon rigidity necessitate use of a heavy screw, it is thus difficult to decrease the width of the tool.

Furthermore, it has been found that in the last-mentioned kind of clamping devices, the clamp has a tendency to turn around the screw at heavy loads or forces on the cutting tool. In this way there are risks of the cutting insert being moved or loosened. Likewise, in the other mentioned known tool in which the clamp was controlled by a cam or equivalent being operated from the side face of the tool, no attention was paid to the rigidity or to the necessary stability of the clamp in its longitudinal direction.

According to the present invention there is now being made available a cutting tool in which the above-mentioned problems have been essentially reduced or eliminated.

The invention will become more apparent from the following description in connection with the accompanying drawing illustrating the invention, wherein.

Figure 1:
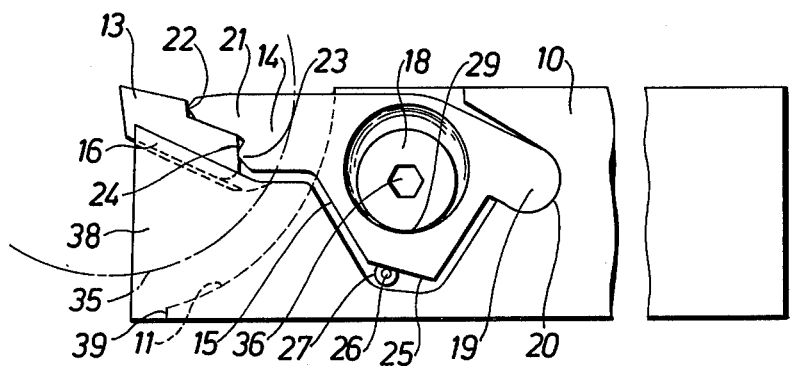
FIG. 1 is a side elevational view of a parting-off tool according to the invention.
Figure 2:
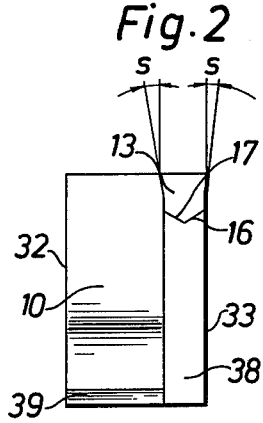
FIG. 2 is a front elevational view of the tool.
Figure 3:
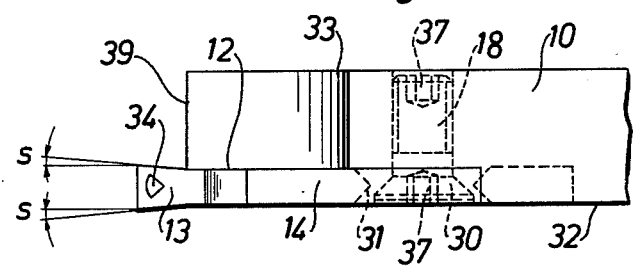
FIG. 3 is a top plan view or a horizontal projection showing the top side of the tool.

The cutting tool shown in FIGS. 1–4 consists of a tool holder 10 which at its front end is provided — in per se previously known ways — with a cylindrical recess or cut 11 so that a stable wall 12 is formed supporting the insert 13 and the clamp 14. Furthermore, the tool holder 10 is provided with a large recess 15 whose front end is a V-shaped support groove 16 for guiding and fixing the cutting insert laterally, which insert in a corresponding way is provided with a V-shaped bottom face 17. The cutting insert is forced against the support 16 by means of the earlier-mentioned clamp 14 arranged as a lever, said clamping device being controlled by a screw 18 attached to the tool holder.

Screw 18 is supplied with key handles or grooves 37 in both ends, thus being easily operated by, for example, an ordinary Allen key from either side of the tool holder. The back part of the clamp is shaped as a rounded tongue 19 supported in a corresponding hollow 20 in the back of the large recess 15 in the tool holder.

In its front part the clamp is provided with a projection 21, which is in contact with a support face 22 of the insert and also forces the cutting insert down to its support. In its front end the clamp is provided with another projection or knee 23 supporting the inner or back side face 24 of the insert. A spring 26 is located against the bottom side 25 of the clamp, being disposed in a hole 27 in the tool holder. The spring may have the shape of a wire or pin fastened in the holder and contacting the clamp with its free end. It is usually directed perpendicular to the direction of the movement of the clamp. By placing this spring beneath the front part of the clamp, between the cutting insert and the point of contact 29 of the screw against the clamp, there is obtained an immediate lifting of said part when the screw is released, the cutting insert thus being easily loosened.

The novel properties of the tool according to the invention deal with the reliable clamping device for the cutting insert. This device is an optimum combination of several elements or features, some of them earlier known per se. Among these elements are: the controlling and moving means for the clamp being operated from the side of the tool; and the longitudinal recess 15 in the tool holder, which recess in its front end 17 supports the cutting insert 13 and in its rear end or main part holds the clamping device 14.

It is very important, and a characteristic for the tool, that the final position in the lateral direction of the clamp 14 is fixed by supporting the clamp on a surface of the holder as the inner longitudinal wall 12 of the large recess 15. In this way, there will be no lateral displacement of the cutting insert 13 because of axial or other forces.

The placing of the screw 18 so that it can be actuated from either side face of the tool holder means, naturally, a great flexibility concerning the placing of the tool. It may thus be disposed upside down in the machine without causing any difficulties regarding the insert change, the adjustability of insert or tool, etc. Furthermore, the upper side or top face of the tool or the clamp — being an "extension" of the chip face of the cutting insert — will be free from those protruding or notched parts normally involved with a fastening screw. Unfavorable interruptions of the chip removal can in this way be eliminated.

The placing of the screw on the side face of the clamp or of the tool naturally gives great possibilities of using a heavy and strong design without limiting the desired "thinness" of the tool. The head of the screw — being of fundamental importance for holding and control of the clamp — can thus be modified in view of optimum strength and availability.

The placing and shaping of the fastening and controlling means for the clamp are, as mentioned earlier, characteristic of the tool according to the invention. They consist of a screw 18 having a concial head 30 co-operating with a corresponding conical recess or hole 31 in the clamp. The screw is placed eccentrically, thus having a displaced center 36, in relation to the conical hole. By rotation of the screw it thus is possible to attain a downward movement of the clamp. The movement and adjustment of the clamp can of course be done in other ways than what has been shown here. There may, for example, be embodiments in which the desired movement of the clamp can be done by means of a wedging action between the screw and the mentioned hole. In other cases or embodiments, the eccentric placing of the screw in relation to the hole is used for the main movement of the clamp. The longitudinal axis of the screw may be essentially perpendicular to the side faces 32, 33 of the cutting tool, but may also have a certain inclination in relation to these faces. It is essential that the screw and the hole be formed so that the downward and lateral movements of the clamp will result in forcing the insert against its bottom support as well as the clamp against its lateral support.

In the embodiment illustrated the cutting insert, which normally consists of cemented carbide or other cutting tool material, is provided with clearances S, applied in the transverse cross-section (FIG. 2) as well as in the longitudinal section (FIG. 3) of the insert. The cutting insert is also supplied with a groove 34 for breaking, and possibly other deformation of, the chip, but it may also be provided with a shoulder for chip-breaking. Normally, the lateral clearance angles are about 5°–7° in the transverse cross-section and about 1°–3° in the longitudinal section. In the clamped position, there is a relatively large positive rake angle, normally being about 8°–12°.

The result is a soft chip flow, reducing the cutting edge build-up resulting in low cutting forces and a low cutting edge temperature. The low cutting forces and cutting edge temperatures effectively help to reduce the risk of deformation of the tool below the insert.

Figure 4:
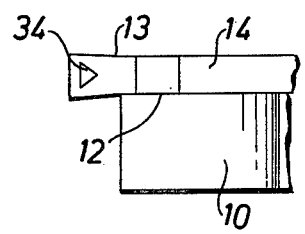
FIG. 4 is an alternative mounting of the cutting insert compared to the previous described embodiment (FIGS. 1-3).

The tool holder can be shaped for left — or right-handed mounting of the cutting insert and be used in left — or right-hand rotating machines. In FIG. 4 there is thus shown an alternative mounting of the cutting insert in relation to the tool holder according to FIGS. 1–3.

The invention is applicable to all kinds of cutting tools with separate inserts, but is particularly important for thin tools such as parting-off and recessing tools. It is remarkable that the clamp can be very thin but still have a maintained stability in its plane of action. Its width is suitably at the most the same as, or smaller than, the width of cutting insert.

Because the cylindrical recess 11 is concentric with the cutting edge of the insert, it is possible to perform a parting-off operation of a work-piece 35 having a diameter which is only slightly less than the diameter of the mentioned recess 11.

The shank of the tool holder has been manufactured to the full width as far forwards as possible and at the front part forms a shoulder 39 giving lateral support to the narrow tongue 38 where the insert is clamped. The danger of lateral deflection is thereby reduced to an absolute minimum. Furthermore, the additional side support makes the holder suitable for facing operations.

A limited number of components and a simple design add to the rigidity of the holder, thus reducing the tool costs and the stock-keeping of spare parts. All these advantages are built-in qualities in the parting-off tool according to the invention.

I claim:

1. In a cutting tool such as a parting-off and recessing tool comprising a cutting insert and a tool holder therefor, said tool holder having a top face, a bottom, two opposed longitudinally extending side faces generally parallel to each other, a front and a back, said tool holder being provided at one of its side faces with a longitudinal recess, said longitudinal recess having a wall perpendicular to the top face of, and extending in the longitudinal direction of the tool holder and constituting an inner wall of said longitudinal recess, said longitudinal recess having a front part shaped as a support for the cutting insert and a main or back part containing a clamp, there being a bore extending transversely through said clamp and into the associated body of the tool holder, said bore being threaded in the holder for the reception of a screw, said bore terminating at the outer face of said clamp in a conical recess, said clamp being arranged as a lever forcing said cutting insert against said support, the clamp being held and operated by means of a screw in engagement with the tool holder, the improvement wherein screw (18) has a conical head (30), cooperating with the aforesaid conical recess (31) in the clamp (14), and a cylindrical shaft, said screw extending into the aforesaid bore from said outer face of said clamp and having an operating-key-receiving groove in the conical head so as to be operatively rotatable from the side face of said tool holder, wherein the clamp is supported by the aforesaid inner wall when the cutting insert is clamped in the tool holder, the cutting insert thus being fixed in its lateral position.

2. Cutting tool according to claim 1, wherein the bore extends transversely from one side face to the other side face of the holder and said screw having operating-key-receiving grooves in the conical head and in the end of the shaft remote from said screw head so as to be operatively rotatable from either side face of said tool holder.

3. Cutting tool according to claim 1, wherein the screw (18) is eccentrically disposed (36) in relation to its co-operating element or hole (31) in the clamp.

4. Cutting tool according to claim 1, wherein the back part of the clamp is shaped as a rounded tongue (19) supported in a corresponding hollow (20) in the tool holder.

5. Cutting tool according to claim 1, wherein a spring (26) is disposed in the tool holder, said spring being in the form of a pin secured in the tool holder at one end thereof and with its free end in contact with the bottom face (25) of the clamp.

6. Cutting tool according to claim 1, wherein the width of the cutting insert is at the least equal to that of the clamp.

7. Cutting tool according to claim 1, wherein the tool holder is provided with a shoulder (39) in its front part extending out to the region of the cutting insert.

* * * * *